Figure 1:
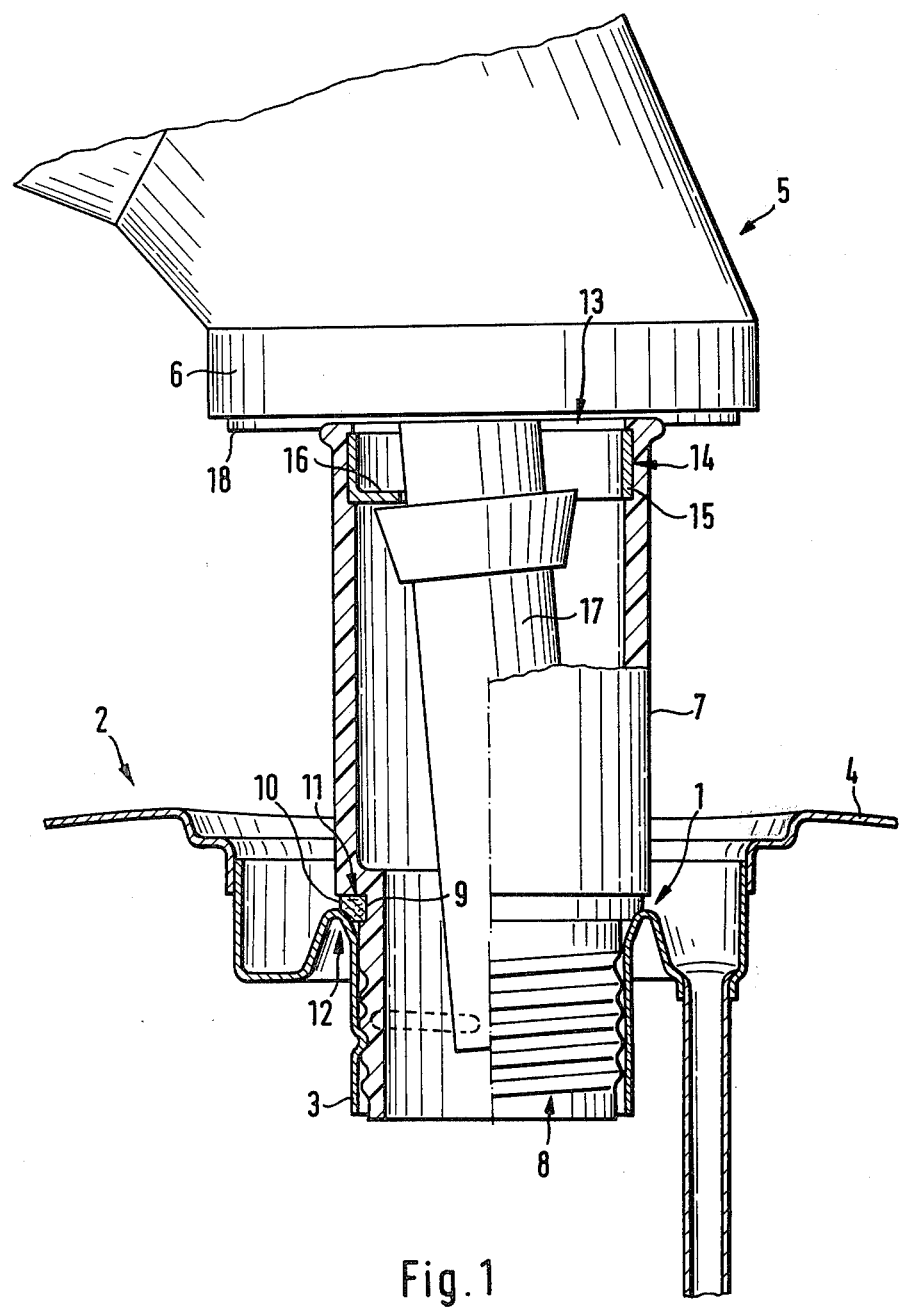

United States Patent [19]

Hundemer

[11] 4,171,750

[45] Oct. 23, 1979

[54] FUEL TANK FOR MOTOR VEHICLES, ESPECIALLY FOR MOTORCYCLES

[75] Inventor: Peter Hundemer, Puchheim, Fed. Rep. of Germany

[73] Assignee: Bayerische Motoren Werke Aktiengesellschaft, Fed. Rep. of Germany

[21] Appl. No.: 898,169

[22] Filed: Apr. 20, 1978

[30] Foreign Application Priority Data

Apr. 23, 1977 [DE] Fed. Rep. of Germany ....... 2718161

[51] Int. Cl.² ............................................. B65B 3/04
[52] U.S. Cl. ................................ 220/86 R; 141/285; 141/392
[58] Field of Search ............... 141/392, 286, 285, 301, 141/311 R, 325, 326; 138/39; 220/85 F, 86 R; 137/587, 588

[56] References Cited

U.S. PATENT DOCUMENTS

| 2,736,525 | 2/1956 | Jones | 248/83 |
| 3,979,010 | 9/1976 | Fiedler et al. | 141/392 |

FOREIGN PATENT DOCUMENTS 150554 9/1920 United Kingdom .

Primary Examiner—Houston S. Bell
Attorney, Agent, or Firm—Craig and Antonelli

[57] ABSTRACT

A fuel tank for motor vehicles, especially for motorcycles, whose fill-in opening is located in the tank wall; a short pipe-like member adapted to be mounted over the fill-in opening in or at the tank wall is provided for receiving the fuel discharge nozzle.

8 Claims, 2 Drawing Figures

FUEL TANK FOR MOTOR VEHICLES, ESPECIALLY FOR MOTORCYCLES

The present invention relates to a fuel tank for motor vehicles, especially for motorcycles, whose fill-in opening is located in the tank wall.

Frequently the fill-in opening is delimited in fuel tanks of motorcycles by a collar-like short pipe piece serving for the arrangement of a closure cover. This short pipe piece or stub either extends only a slight amount above the tank wall or projects from the tank wall into the fuel tank. If with such a fuel tank a filling is to be carried out by means of an automatically shutting-off fuel-dispensing nozzle having a device for sucking off the fuel vapor-air mixture in the fuel tank, then an inadequate or incomplete filling of the fuel tank is achieved. This disadvantage results from the fact that during the filling operation, the suction device arranged at the discharge pipe of the fuel-dispensing nozzle has to tightly close off the filling opening, and in that additionally the discharge pipe projects from the suction device with a considerable length into the fuel tank and the automatic shut-off mechanism responds in a very sensitive manner.

The present invention is therefore concerned with the task to so improve the fuel tank that as great as possible a filling is achieved with every type of fuel-dispensing nozzle.

The underlying problems are solved according to the present invention in that an attachment adapted to be installed by way of the fill-in opening in or at the tank wall for the reception of a discharge nozzle is provided. It is achieved therewith in an advantageous manner that the discharge orifice of the fuel-dispensing nozzle is disposed during the filling operation approximately within the area of the fill-in opening of the fuel tank and as a result thereof the tank can be filled well.

In one embodiment of the present invention the attachment is constructed for achieving a simple handling as short pipe piece, which for attaining a maximum filling by way of the fill-in opening has a height whose dimension corresponds essentially to the insertion depth of the fuel-dispensing nozzle equipped with a suction device.

For achieving an automatic tanking, the short pipe piece according to a further feature of the present invention is equipped with means for the retention of the inserted fuel-dispensing nozzle.

According to a further proposal according to the present invention, the short pipe piece is constructed as an additional part removable from the fuel tank, with which a fuel tank of the type described hereinabove can be equipped subsequently in an advantageous manner. In order to keep low the constructive expenditure of the additional short pipe piece, the short pipe piece is constructed so as to be connectable with fastening means in or at the tank wall for a closure member adapted to be introduced into the fill-in opening.

A construction of the additional short pipe piece which is relatively inexpensive in manufacture is achieved by a construction thereof as synthetic plastic molded part which is adapted to be threadably connected preferably at one end with a threaded, short connecting pipe section delimiting the fill-in opening and provided for a closure cover and which is provided at the other end with a recess extending circumferentially along the inner wall for the accommodation of a retaining ring for the fuel-dispensing nozzle. The threaded connection offers together with a simple handling involving lowest force application, a safe retention of the short pipe piece in the tank wall of the motor vehicle tank. Preferably, the retaining ring is pressed into the recess in order to keep low the manufacturing costs.

A still more simple handling of the short pipe piece is achieved if according to another feature of the present invention, the same is structurally integrated into the fuel tank and is adapted to be inserted and removed by way of the fill-in opening.

A configuration which is simple in construction and reliable in operation is achieved in that the short pipe piece is adapted to be removed and inserted by way of a threaded connection and during the screwing-in abuts with a collar by way of a seal against the upper edge of a short threaded connecting section guiding the short pipe piece and the short pipe piece is adapted to be closed by means of a bayonet-lock cover. The short pipe piece which is provided essentially over its entire height with an external thread is preferably inserted into a threaded short pipe connecting section provided at the fuel tank for a threaded closure cover in order to keep low the structural expenditures in an advantageous manner. The bayonet-lock cover is of particular advantage for the handling of the short pipe piece when screwing the same out or in, insofar as such a cover permits a rotation of the short pipe piece also in the unlocked condition by abutment of the locking elements against abutments.

The short pipe piece described hereinabove which is adapted to be screwed in and out may also be structurally integrated subsequently into a fuel tank in an advantageous manner. The structural integration is enhanced in an advantageous manner by tongues provided at the free end of the short pipe piece, which after the introduction of the short pipe piece into the threaded pipe connecting section are bent off toward the outside and thus abut as end abutments against the lower edge of the threaded pipe section when screwing out the short pipe piece during operation.

Accordingly, it is an object of the present invention to provide a fuel tank for motor vehicles, especially for motorcycles, which avoids by simple means the aforementioned shortcomings and drawbacks encountered in the prior art.

Another object of the present invention resides in a fuel tank for motor vehicles, especially for motorcycles, which permits a complete filling of the tank even with automatic filling nozzles.

A further object of the present invention resides in a fuel tank for motor vehicles, especially for motorcycles, which enables a greatest possible filling of the tank with any type of discharge nozzle.

Still a further object of the present invention resides in a fuel tank, especially for motorcycles, which allows a substantially full automatic tanking utilizing extremely simple means from a constructive and manufacturing point of view.

A further object of the present invention resides in a fuel tank for motor vehicles, especially for motorcycles, which is equipped with means for the retention of the inserted nozzle.

Still another object of the present invention resides in a fuel tank of the type described above which is not only simple in construction and reliable in operation but which can be subsequently installed into pre-existing tanks by simple means.

Figure 2:
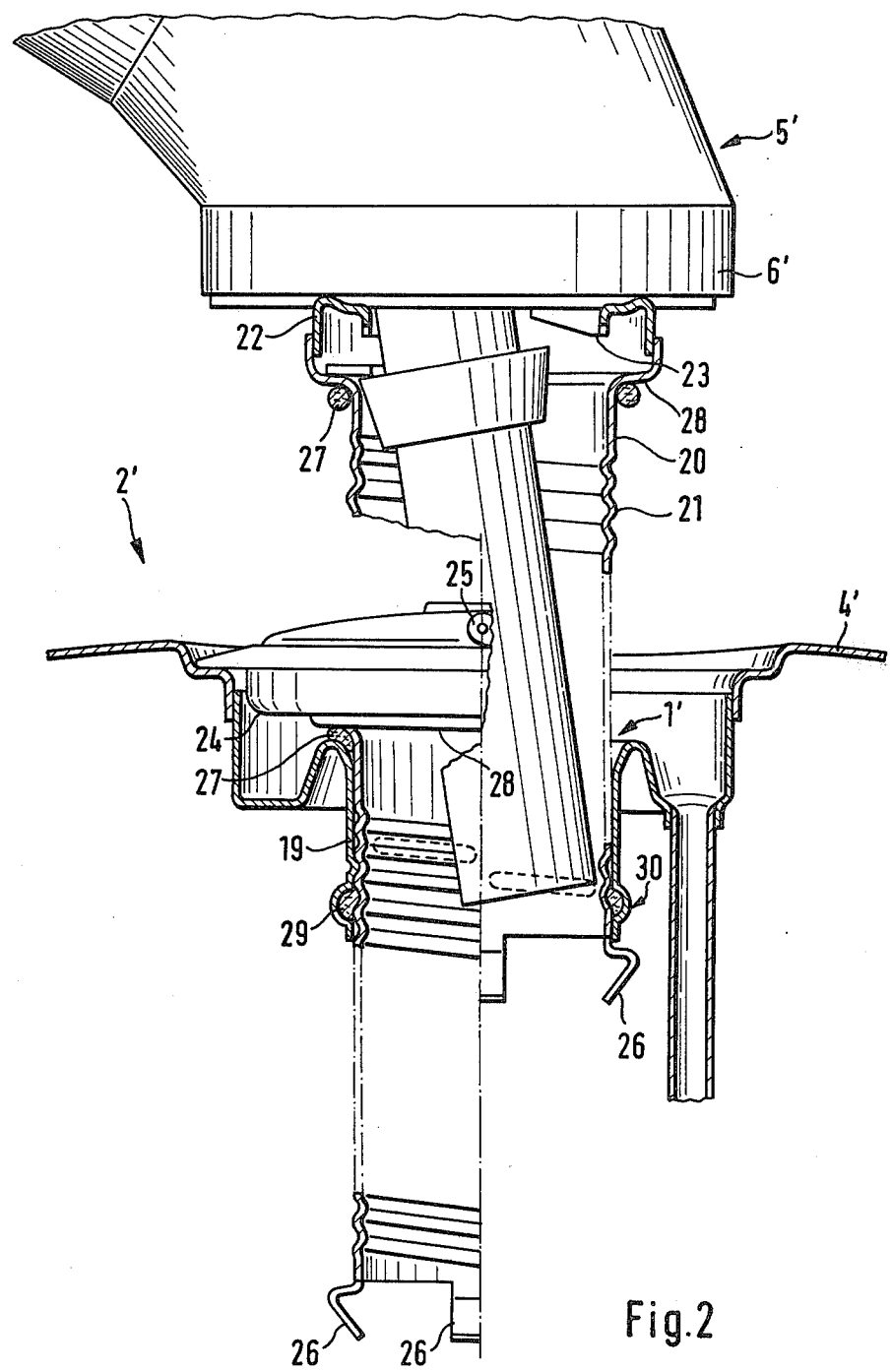

These and other objects, features and advantages of the present invention will become more apparent from the following description when taken in connection with the accompanying drawing which shows, for purposes of illustration only, two embodiments in accordance with the present invention and wherein:

FIG. 1 is a partial cross-sectional view through a fuel tank and short pipe piece adapted to be mounted thereon in accordance with the present invention for receiving a fuel nozzle; and FIG. 2 is a partial cross-sectional view through a fuel tank provided with a short pipe piece adapted to be lowered into the tank in accordance with the present invention and showing the latter in its two end positions in the left and right part of this figure.

Referring now to the drawing, wherein like reference numerals are used throughout the two views to designate like parts and more particularly to FIG. 1, this figure shows the area of a fill-in opening generally designated by reference numeral 1 of a fuel tank generally designated by reference numeral 2 (not shown in detail) of a motorcycle. The fill-in opening 1 is delimited by a short threaded pipe connecting section 3 for a threaded closure cover (not shown). The short threaded pipe connecting section 3 is arranged recessed with respect to the upper tank wall 4 whereby the threaded closure cover is essentially flush with the contour of the tank wall 4 in the closing position thereof.

For achieving a maximum filling of the fuel tank 2 by means of an automatically shutting-off discharge nozzle 5 having a conventional suction device 6 sucking off the fuel vapor-air mixture during the filling operation, the fuel tank 2 is equipped with an attachment constructed as short pipe piece 7. The short pipe piece 7 is preferably constructed as synthetic plastic molded part and includes two cylindrical sections of different diameter. In the lower section of smaller diameter, the short pipe piece 7 is provided with an external thread 8 for the threaded connection with the short threaded pipe section 3. A sealing ring 10 is arranged in a circumferential groove 9 adjoining the external thread 8. During the screwing-in of the short pipe piece 7, the sealing ring 10 is pressed by way of the shoulder 11 at the transition from the lower to the upper section larger in diameter against the orifice 12 of the short threaded pipe section 3 and thus a gas-tight and liquid-tight closure is achieved. A circumferential recess 14 is provided along the inner wall of the upper section near the insert opening 13 of the short pipe piece 7. A closed ring 15 having a retaining angle portion 16 is pressed into this recess 14. The discharge nozzle 5 together with its discharge pipe 17 is suspended at the retaining angle portion 16, whereby an elastic abutment 18 at the suction device 6 closes off the insert opening 13 in a gas-tight manner. As can be finally seen from FIG. 1, the short pipe piece 7 has a height above the fill-in opening 1, which corresponds in its dimension essentially to the insertion depth of the discharge pipe 17.

FIG. 2 illustrates a fuel tank 2' with a short threaded connecting pipe section 19 also arranged recessed with respect to the upper tank wall 4', which delimits a fill-in opening 1'. A short pipe piece 20 is inserted into the short threaded pipe section 19, which is provided with an external thread 21 essentially over its entire height. The short pipe piece 20 for purposes of filling the fuel tank 2' can be brought by means of the aforementioned threaded connection into a position illustrated in the right half of FIG. 2, in which the short pipe piece 20 projects above the tank wall 4'. The short pipe piece 20 which is structurally integrated in the fuel tank 2' is constructed, for example, as sheet metal stamping or pressed-out part. In its upper end section, the short pipe piece 20 is enlarged pot-like for the accommodation and mounting of a ring 22 with cam tracks 23 for a bayonet-lock cover 24. The bayonet-lock cover 24 may be provided with an erectable bow-shaped member 25 for its handling. The bow-shaped member 25, however, serves at the same time for screwing-in and screwing-out the short pipe piece 20. In its lower end section, the short pipe piece 20 is provided with tongues 26 which after the installation of the short pipe piece 20 in the fuel tank 2' are bent off toward the outside. These bent-off tongues 26 serve as end stops which cooperate with the lower edge of the short threaded pipe section 19 during the screwing-out of the short pipe piece 20.

As can be seen from FIG. 2, with a screwed-in short pipe piece 20, a seal 27 is pressed by way of a collar 28 against the short threaded pipe section 19 so that neither liquid nor gases can escape by way of the threaded connection. This seal can be reinforced by a further sealing ring 29 of felt which is arranged in a groove 30 of the short threaded pipe section 19 and which abuts sealingly against the outer thread 21 of the short pipe piece 20. This felt 29 prevents with a screwed-out short pipe piece 20 during the filling operation an escape of fuel vapor-air mixture into the atmosphere by way of the threaded connection.

According to FIG. 2, the bayonet-lock cover 24 which closes the short pipe piece 20 may be disposed essentially in the contour of the tank wall 4' when the short pipe piece 20 is screwed-in.

While I have shown and described only two embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A fuel tank for motor vehicles, such as motorcycles, comprising a tank having a fill-in opening in the wall thereof, said fill-in opening being delimited by a filling pipe in the tank wall, which filling pipe has fastening means for removably engaging with a closure cover and is connectable to a nozzle receiving means by way of the fastening means, said nozzle receiving means receiving a discharge nozzle with suction means for the fuel vapor-air mixture in the fuel tank and including an insertion opening for the discharge nozzle, said nozzle receiving means being of such a length that when connected to said filling pipe it extends to a height above the fill-in opening of the tank which corresponds essentially to the insertion depth of the discharge nozzle, retaining means being provided in said nozzle receiving means for retention of the inserted discharge nozzle, said retaining means being provided in said nozzle receiving means at a predetermined distance below the insertion opening so that said insertion opening can be sealed gas tight by a sealing means associated with the suction means of said discharge nozzle.

2. A fuel tank according to claim 1, characterized in that said nozzle receiving means is a short pipe peice and wherein the connection between the nozzle receiving means and the filling pipe is a threaded connection.

3. A fuel tank according to claim 2, characterized in that the short pipe piece is constructed as an auxiliary part removable from the fuel tank and is a synthetic plastic molded part which at one end is adapted to be threadedly connected with the filling pipe and which at the other end includes a circumferential recess along the inner wall thereof for accommodating the retaining means.

4. A fuel tank according to claim 3, characterized in that said molded short pipe piece includes two adjacent cylindrical segments of different diameters, the segment of smaller diameter having an external thread for connection with said filling pipe, said external thread extending to a shoulder on said pipe piece at the transition between the two segments, and wherein a sealing ring is provided at said shoulder for sealing against an upper edge of said filling pipe.

5. A fuel tank according to claim 2, characterized in that the short pipe piece is structurally integrated into the fuel tank and is adapted to be removed and reinserted by way of the fill-in opening.

6. A fuel tank according to claim 5, characterized in that the short pipe piece is adapted to be removed and inserted by way of the threaded connection and during the screwing-in abuts with a collar provided on said short pipe piece by way of a seal against an upper edge of the filling pipe guiding the short pipe piece, and wherein said short pipe piece is adapted to be closed by a cover having a bayonet lock.

7. A fuel tank according to claim 6, characterized in that when the short pipe piece is screwed into the fuel tank the bayonet lock cover is disposed essentially within the contour of the tank wall.

8. A fuel tank according to claim 5, characterized in that the short pipe piece is provided at its lower end with tongues adapted to be bent off which limit the screwing out by abutment thereof against the lower edge of the filling pipe.

* * * * *